Nov. 3, 1953        H. R. ZIEBELL        2,657,491
FOLDING FISH NET
Filed Jan. 23, 1948
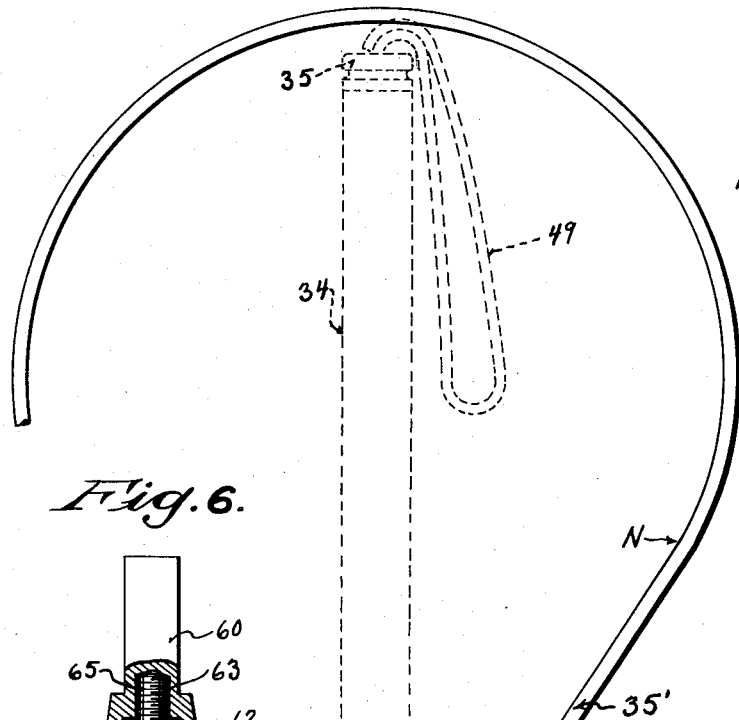
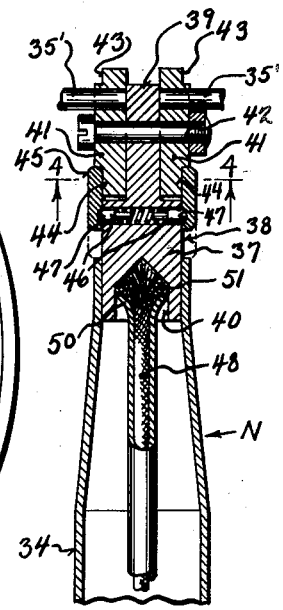
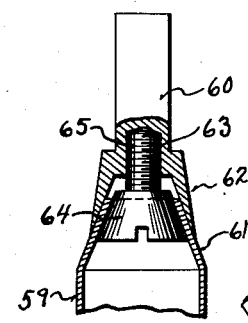
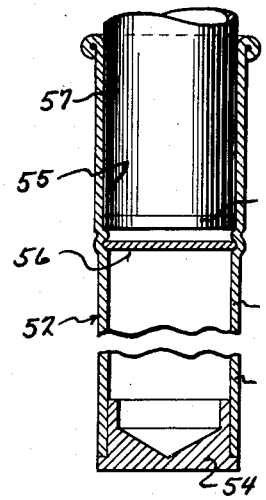
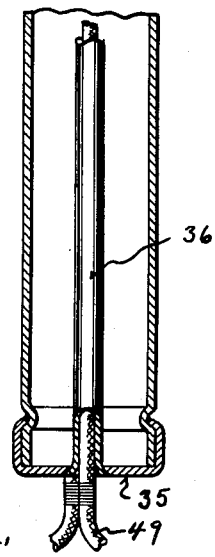
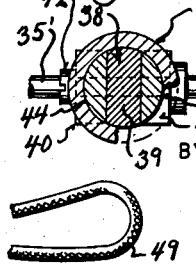
INVENTOR
HARVEY R. ZIEBELL
ATTORNEYS Patented Nov. 3, 1953

2,657,491

UNITED STATES PATENT OFFICE 2,657,491

FOLDING FISH NET

Harvey R. Ziebell, Oshkosh, Wis.

Application January 23, 1948, Serial No. 4,035

2 Claims. (Cl. 43—12)

1

This invention appertains to landing nets for fish and more particularly to a novel floating and collapsible fish net.

One of the primary objects of my invention is to provide a landing net having a hollow handle so constructed and arranged as to form a float, whereby if the net is accidentally dropped into the water, the same will not sink, so as to prevent the loss thereof.

Another salient object of my invention is to provide a landing net having the frame or hoop thereof for the net connected to the handle in a novel manner, so that said frame can fold back alongside of the handle when the net is not in use.

A further object of my invention is to provide a fish landing net having novel means for releasably and instantly locking the hoop or frame to the handle against swinging movement when the net is in its extended, operative position relative to the handle.

A further important object is to so form the handle and hoop, that the hoop can be locked either in its open extended position or in its collapsed folded position against swinging movement.

With these and other objects in view, the invention consists in the novel construction, arrangement and formation of parts, as will be hereinafter more specifically described and claimed, and illustrated in the accompanying drawings, in which drawings:

Figure 1 is a top plan view of my novel fishing net showing the handle in its extended, operative position in full lines and in its collapsed position in dotted lines, parts of the figure being shown broken away and in section, the woven net part being omitted.

Figure 2 is an enlarged longitudinal sectional view through the handle and head of the landing net.

Figure 3 is a detail sectional view taken on the line 3—3 of Figure 1, looking in the direction of the arrows.

Figure 4 is an enlarged transverse sectional view taken through the head of the handle and on the line 4—4 of Figure 2, looking in the direction of the arrows.

Figure 5 is an enlarged fragmentary detail sectional view illustrating means whereby a hollow extension section can be associated with the rear end of the handle of the fish net.

Figure 6 is a fragmentary, detail, sectional view illustrating a novel form of means for connecting the head to the handle.

Referring to the drawings in detail wherein similar reference characters designate corresponding parts throughout the several views, the letter N generally indicates my novel landing net.

The landing net N includes a hollow handle 34 and a swinging hoop 35'. The rear end of the hollow handle is sealed by a closure cap 35 against the admittance of water, and this cap has secured thereto an inwardly directed, axially disposed tube 36. The tube 36 is in water tight connection with the cap 35. The forward end of the handle 34 is brought tight about the inner cylindrical plug portion 37 of a head 38. The head 38 projects beyond the handle and has formed thereon the flat shank 39. It is to be noted that the inner end of the cylindrical plug portion 37 of the head 38 has formed therein a tapered socket 40, the purpose of which will later appear.

The hoop 35' which carries the net proper (not shown in these figures) is also made from a suitable length of rod bent into the desired form, and the ends of the hoop are rigidly anchored to blocks 41, which engage the opposite sides of the flat shank 39. A pivot pin 42 connects the blocks 41 intermediate their ends to the shank 39 intermediate its ends. The terminals of the blocks are preferably rounded to form seats 43 at their forward ends and seats 44 at their rear ends.

Slidably mounted upon the plug 37 is a locking sleeve 45, and when the hoop and handle are in their folded, collapsed position, the sleeve 45 can be moved forwardly on to the seat 43 so as to hold these parts against swinging movement. When the hoop and handle are in their extended, operative position, the sleeve can be pushed forwardly over the seats 44, and this will effectively hold the net in its extended, operative position. When the sleeve is in its locked forward position over the seats 44, the same can be held against accidental sliding movement by spring pressed detents 46 carried by the plug. These detents are adapted to spring in shallow sockets 47 formed in the inner face of the sleeve.

In this form of my fish net, I have illustrated novel means for associating an elastic cord 48 with the handle. The cord, at its outer end, can be folded back to form a loop 49, and this loop can be pinned or otherwise fastened to the clothing of the fisherman. The cord is threaded through the tube 36, and the forward end of the tube is flared as at 50 to provide a seat, the purpose of which will later appear. After the cord is threaded through the tube, the same is wrapped with thread, twine or elastic cord 51 to provide a knob, and the entire knob is impregnated with a cement.

In fabricating the net, after the elastic cord 48 is threaded through the tube and the knob is formed and impregnated, the plug 37 is then forced into the hollow handle, tight down against the knob, and the knob will be forced against the flared end 50 of the tube. Not only will this prevent the withdrawal of the elastic cord from the tube, but a water tight connection will be had.

In some instances, it will be desirable to have a longer handle and to suit these conditions, I can provide an extra handle section 52 (see Figure 5). This section 52 is also constructed to form a float and includes a hollow shell 53 having its rear end sealed by a cap 54. The forward end of the section 52 defines a socket 55 and a disc 56 is fitted in the shell in rear of the socket 55 to close the shell against the admittance of water. The handle for the net is indicated in this figure by the reference character 57, and it is to be noted that the closure plug 48 for the rear end of the handle is flush with the outer surface thereof, so that the handle 57 for the net can be inserted in the socket 55.

In Figure 6, I have shown a novel means for connecting the head with the handle which not only permits quick assembly but also assures a strong watertight joint. In this figure, the handle is indicated by the reference character 59 and the head by the reference character 60. The inner end of the handle 59 is spun to provide a hollow frustro-conical extension 61. The spinning of the handle slightly increases the wall thickness of the extension toward its forward end. The head 60 is provided with a conical cup 62 for receiving the extension 61 and an internally threaded axial socket 63. Received in the extension 61 is a conical plug 64 having a slightly less taper than the extension 61. Formed on the plug is an axially disposed threaded stud 65. When the stud 65 is threaded into the socket 63, the plug 64, the cup 62 and the extension 61 are all drawn into tight, intimate binding contact. The taper of the plug 64 is such that the metal of the extension 61 is slightly expanded and forced outwardly into its intimate sealing engagement with the cup 62.

Various changes in details can be made without departing from the spirit or the scope of my invention, but what I claim as new is:

1. A landing net for fish comprising a handle having a forwardly projecting shank, a net carrying hoop, blocks rigidly secured to the ends of the hoop engaging the opposite sides of the shank, said blocks having rounded seats on their opposite ends, and a sliding sleeve carried by the handle adapted to releasably engage the seats when the handle and hoop are in either one of their two positions.

2. A landing net for fish comprising a handle having a forwardly projecting shank, a net carrying hoop, blocks rigidly secured to the ends of the hoop engaging the opposite sides of the shank, said blocks having rounded seats on their opposite ends, a sliding sleeve carried by the handle adapted to releasably engage the seats when the handle and hoop are in either one of their two positions, and means releasably holding the sleeve against accidental sliding movement.

HARVEY R. ZIEBELL.

References Cited in the file of this patent

UNITED STATES PATENTS

| Number | Name | Date |
| --- | --- | --- |
| 258,733 | Ezard | May 30, 1882 |
| 382,317 | McClintock | May 8, 1888 |
| 407,979 | Wheeler | July 30, 1889 |
| 752,550 | Heritage | Feb. 16, 1904 |
| 789,021 | Hartman | May 2, 1905 |
| 1,190,491 | Watts et al. | July 11, 1916 |
| 1,796,721 | Price et al. | Mar. 17, 1931 |
| 1,857,826 | Slamen | May 10, 1932 |
| 2,491,703 | Bell | Dec. 20, 1949 |

FOREIGN PATENTS

| Number | Country | Date |
| --- | --- | --- |
| 2,560 | Great Britain | 1885 |
| 359,483 | France | Mar. 28, 1906 |
| 524,686 | France | Sept. 18, 1921 |
| 912,596 | France | Aug. 13, 1946 |